United States Patent Office 3,379,511
Patented Apr. 23, 1968

3,379,511
PRODUCTION OF SODIUM BOROHYDRIDE
Helmut Knorre, Hainstadt am Main, Harry Kloepfer, Frankfurt am Main, and Günther Bretschneider, Gelnhausen, Germany, assignors to Deutsche Gold- und Silber-Scheideanstalt vormals Roessler, Frankfurt am Main, Germany
No Drawing. Filed Sept. 16, 1963, Ser. No. 309,279
Claims priority, application Germany, Sept. 25, 1962, D 39,908
7 Claims. (Cl. 23—361)

The present invention relates to an improved process for the production of sodium borohydride and more particularly relates to a process for the production of such borohydride by treatment of alkali metal or alkaline earth metal borate-sodium monoxide mixtures with reducing agents in the presence of hydrogen at elevated temperatures under atmospheric to moderately raised pressure.

It is known that borohydrides can be produced by the reductioin of borates or comparable metal oxide boron oxide mixtures in the presence of hydrogen using aluminum or similar reducing metals as a reducing agent at temperatures over 100° C. under superatmospheric pressures of, for example, 100 to 300 atmospheres. In such process it has also been proposed in addition instead of using orthoborates or such material to use mixtures of metaborate and calcium oxide, or of $B_2O_3$ and BaO or of $HBO_2$ and SrO in conjunction with silicon as a reducing agent. It is of disadvantage in such processes that they only can be carried out under superatmospheric pressures of 100 to 300 atmospheres at temperatures of 600° C. and over. In such processes the CaO, BaO or SrO were added to bind the silica produced as silicates and to reduce the plasticity of the reactant mass.

According to the invention it was unexpectedly found that sodium borohydride can be prepared from borate reducing agents and hydrogen at atmospheric pressure or only moderately raised pressures such as gauge pressures up to about 10 atmospheres and at relatively lower temperatures than heretofore required to obtain good yields of borohydride by treating an intimate and finely divided mixture of an alkali metal or alkaline earth metal borate in which the ratio $Me^I_2O$ or $Me^{II}O:B_2O_3$ is less than 3:1, sodium monoxide ($Na_2O$) and a reducing agent with hydrogen.

The addition of the sodium monoxide to the reaction mixture according to the invention produces a special effect not exhibited by other metal oxides in that it activates the reaction mixture so that good yields of sodium borohydride can be produced under much milder conditions than heretofore were possible. For example, when an intimate finely divided mixture of equimolar proportions of $NaBO_2$, $Na_2O$ and Si (in the form of ferro silicon 80% Si) was heated under hydrogen at atmospheric pressure a strong exothermic action begins at about 250° C. which is accompanied by a brisk hydrogen take-up which causes rapid rise of the temperature to about 500° C. Upon maintaining the reaction temperature at about 500° C. further rapid hydrogen take-up occurs. After a reaction period of about 3 hours the reaction product contains about 15.5% of $NaBH_4$ which is 68% of theory. If, on the other hand, the sodium monoxide is replaced by calcium oxide no borohydride formation could be achieved at atmospheric pressure at a temperature of 500° C. Even higher yields of $NaBH_4$, for example, up to about 90% of theory, can be obtained with the process according to the invention when essentially pure silicon is used in place of the ferro silicon. It was surprising that such good yields could be obtained according to the invention at atmospheric pressure and relatively low temperature without even briquetting of the finely divided reaction mixture.

It is very essential for the success of the process according to the invention that the solid starting materials be as finely divided as possible. The average particle size should if possible be below $20\mu$ and preferably be below $10\mu$. Especially good results are obtained with a particle size less than about $5\mu$.

In order to obtain as intimate a mixture as possible, it is expedient first to mix the finely divided boron compound with the finely divided reducing agent, such as silicon, and thereafter admixing the finely divided sodium monoxide. Of course, care must be taken that all comminution and mixing procedures be carried out under exclusion of moisture.

As indicated above, boron compounds in which the molar ratio of $Me^I_2O$ or $Me^{II}O:B_2O_3$ ($Me^I$ representing alkali metal and $Me^{II}$ representing alkaline earth metal) is less than 3:1 are concerned for the process according to the invention. Examples of such borates are metaborates and preferably dehydrate borax ($Na_2B_4O_7$). However, it is also possible to employ mixtures of such borates with borates in which the $Me^I_2O$ or $Me^{II}O:B_2O_3$ ratio is 3:1 or more, such as is the case in finely divided mixtures of meta- and orthoborates.

Special prepurification of the starting materials is not necessary so that normal commercial products can be used.

Expediently, 1 to 1.3 mol of $Na_2O$ are employed in the starting mixture per g.-atom of boron.

Metallic silicon aluminum and their alloys, such as ferro silicon, as well as all the metals whose oxides are not reduced by hydrogen under the conditions of the reaction and their alloys can be used as the reducing agent. Silicon and ferro silicon are especially advantageous for the process according to the invention. The quantity of reducing agent employed can be stoichiometric but preferably is in excess of stoichiometric up to a maximum of 20% excess but preferably only about 5% excess in order to achieve better yields.

As indicated above, the process according to the invention is carried out at atmospheric pressure or under moderately raised pressures. Usually only such pressures are employed as are required for expedient supply of the hydrogen to the reaction space as it is consumed therein. While ordinarily gauge pressures of about 1 atmosphere or less suffice, obviously several atmospheres, for example, 5 to 10 atmospheres gauge pressure, could also be used for this purpose. Such pressures, however, are distinctly distinguished from the extremely high pressures employed by the prior art. Naturally the process according to the invention could also be carried out under high pressures, for example, up to 300 atmospheres. However, the primary technical advantage of the process according to the invention resides in the fact that it can be carried out at atmospheric or only slightly raised pressure with good yields.

As the reaction according to the invention is exothermic, it is not necessary to supply any substantial amounts of heat from an external source for the entire reaction. It suffices merely to heat the reaction mixture in contact with hydrogen to the ignition temperature of about 120° C. The heat which is liberated supplies substantially all of the heat required for maintaining the preferred range of reaction temperatures. The reaction temperatures employed according to the invention are under about 550° C. and preferably are in the range of about 420 to 500° C. It is self understood that under certain circumstances it may be necessary to supply or withdraw heat to maintain the desired temperatures. In addition, it is possible to regulate the temperature by appropriate metering in of the starting mixture both with regard to quantity and rate. After the first strong exothermic reaction period has passed it is expedient to maintain the reaction mixture at the reaction temperature for a further 2 or 3 hours.

In an advantageous embodiment of the process according to the invention the finely divided intimate starting mixture of solids is supplied to the reaction chamber in such a manner that agglomeration of the fine particles to layer aggregates is avoided. This, for example, can be achieved by dusting in the finely divided starting mixture into the reaction chamber containing the hydrogen heated to reaction temperatures whereby the reaction already occurs in the finely divided state which renders it possible to obtain substantially increased yields. In addition, when proceeding in this manner, it is possible to avoid a sudden rise in pressure which might occur as a consequence of initiation of the reaction in larger quantities of the starting mixture so that the reaction may easily be controlled.

It is especially expedient if the starting mixture, preheated if desired, is dusted into the reaction chamber containing hydrogen preheated to reaction temperatures in such quantities and at such a rate that the reaction of the individual particles takes place practically immediately after they reach the reaction chamber and that the temperature of the reaction chamber hardly changes practically without the necessity of any cooling or heating from an external source. The preheating of the finely divided starting mixture preferably is effected while it is being dusted in. When this reaction procedure is followed it is also desirable that the reaction mixture be maintained at reaction temperature for some time after the first highly exothermic phase has completed.

When the last mentioned mode of supply of the finely divided starting mixture is employed to control and maintain the reaction temperatures it is possible to carry out the reaction continuously, for example, by providing for continuous removal of the reaction products from the reaction chamber. It, however, is also possible, for example, to dust the finely divided starting mixture of solids onto an appropriately heated moving metal band or rotating disc. The band or disc, for example, can be so heated that the particles transported thereby pass through all required temperatures during the required period of time. The reaction products can be removed from such bands or discs by known expedients.

The reaction products according to the invention are produced as a loosely coherent mass which is easily broken up into a granular free flowing form. The sodium borohydride produced only contains alkali metal and/or alkaline earth metal silicate and possibly small quantities of reducing agent and starting borate. The product can be used as such for reductions.

If purified sodium borohydride is desired it can be extracted from the reaction product in a known manner with solvents, such as ammonia, n-propylamine, diethylene glycol dimethyl ether and the like. Naturally the process according to the invention can be carried out in the presence of diluents, such as carbon black, calcined charcoal and the like. Advantageously the reaction mixture may also be stirred during the reaction.

The following examples will serve to illustrate the invention.

Example 1

A mixture of 132 g. of ground, water free sodium metaborate, $NaBO_2$, 124 g. of ground sodium oxide, $Na_2O$, and 70 g. of Fe-Si dust (80% Si) was heated in an iron reaction vessel under hydrogen of a gauge pressure of about 40 mm. Hg. Upon reacting at about 120° C. the first take-up of hydrogen was observed. A strong exothermic reaction which began at about 150-250° C. caused the temperature to rise rapidly to about 500° C. Thereafter first hydrogen consumption was again observed. The reaction mixture was maintained for about 3 further hours at 500° C. under hydrogen at a gauge pressure of 50 mm. Hg. and then allowed to cool. The reaction product which was a porous friable mass contained 15.5% by weight of $NaBH_4$ which is about 68% of theory.

Example 2

132 g. of water free $NaBO_2$, preground in a studded disc mill, was ground together with 63 g. of preground silicon (98%) in a porcelain ball mill for 8 hours under nitrogen. 124 g. of ground $Na_2O$ were then admixed with such mixture with complete exclusion of moisture and the total mixture then passed through a rod mill and continuously dusted into a reaction chamber preheated to about 420° C. and containing hydrogen at a gauge pressure of about 1 atmosphere. The rate at which the finely powdered mixture was introduced into the reaction chamber was such that the temperature of 420° C. was maintained therein solely by the heat liberated by the ensuing exothermic reaction. After all of the powdered mixture had been introduced the temperature in the reaction chamber was gradually raised to 500° C. and held at such temperature for about 3 hours. After cooling the reaction product a light gray porous friable mass was removed from the reaction chamber. It contained 21.6% by weight of $NaBH_4$ which is about 93% of theory with reference to $NaBO_2$. The reaction involved is represented by the following equation:

$$NaBO_2 + Na_2O + 2H_2 + Si \rightarrow NaBH_4 + Na_2SiO_3$$

Example 3

101 g. of dehydrated borax, $Na_2B_4O_7$, granules and 63 g. of preground silicon (98%) were ground together under nitrogen for 8 hours in a porcelain ball mill. 155 g. of finely preground $Na_2O$ were then admixed with the resulting mixture. The total mixture was then reacted as described in Example 2. The product again was a loose porous mass. Upon extraction with n-propylamine $NaBH_4$ was recovered in about a 90% yield.

Example 4

97 g. of a reaction product of 1 mol of dehydrated borax with 3 mol of $Na_2O$ having the empirical formula $Na_4B_2O_5$ were ground together with 33 g. of water free $NaBO_2$ in a porcelain ball mill. Thereafter 31 g. of ground $Na_2O$ and 54 g. of Al dust were admixed therewith and the total mixture reacted as in Example 2. The product which was a loose mass contained about 20.4% $NaBH_4$ which is about 79% of theory.

Example 5

126 g. of water free calcium metaborate and 65 g. of Si (98%) were ground together under nitrogen for eight hours in a porcelain ball mill. Then 124 g. of preground $Na_2O$ were admixed with the resulting mixture under complete exclusion of moisture. The total mixture was introduced into the reaction chamber as described in Example 2 which, however, was preheated to 500° C. and contained hydrogen under 8-9 atmospheres gauge pressure. After the introduction of such mixture had been completed the reaction mixture was heated to 550° C. for a further 2 hours. The resultant reaction product contained about 19.5% $NaBH_4$ which is about 82% of theory.

We claim:

1. A process for the production of sodium borohydride which comprises heating an intimate mixture of (1) a finely divided borate composition selected from the group consisting of alkali metal borates, alkaline earth metal borates and mixtures thereof, the molar ratio of metal oxide $B_2O_3$ in said borate composition being less than 3:1 (2) finely divided $Na_2O$ and (3) a finely divided reducing metal selected from the group consisting of silicon, aluminum and ferrosilicon under hydrogen at a pressure between atmospheric and about one atmosphere gauge pressure to a temperature sufficient to cause hydrogen to take up by the mixture and react therewith and maintaining a reaction temperature not exceeding about 550° C.

2. The process of claim 1 in which the molar proportion of borate composition to $Na_2O$ is such to provide 1 to 1.3 mol of $Na_2O$ per g. atom of boron and the quantity of reducing metal being from about stoichiometric up to an excess of about 20%.

3. The process of claim 2 in which the average particle size of the borate composition, $Na_2O$ and reducing metal is below $10\mu$.

4. The process of claim 2 in which said reducing metal is silicon.

5. The process of claim 2 in which the major portion of the reaction is carried out at a temperature between about 420 and 500° C.

6. The process of claim 2 in which said intimate mixture of finely divided borate composition, $Na_2O$ and reducing metal is dusted into a reaction chamber preheated to reaction temperature and containing hydrogen at a pressure between atmospheric and about one atmosphere gauge pressure.

7. The process of claim 6 in which the reaction chamber is preheated to a temperature between about 420 and 550° C. and said intimate finely divided mixture is supplied thereto in such quantities and at such a rate that such temperature is maintained solely by the ensuing exothermic heat of reaction while said mixture is supplied thereto.

References Cited
UNITED STATES PATENTS

| | | | |
|---|---|---|---|
| 2,974,015 | 3/1961 | Peterson | 23—361 X |
| 3,164,441 | 1/1965 | Goerrig | 23—361 |

MILTON WEISSMAN, *Primary Examiner.*